United States Patent
Nagai et al.

(10) Patent No.: US 7,292,522 B2
(45) Date of Patent: Nov. 6, 2007

(54) OPTICAL DISC WITH WOBBLED TRACKS AND APPARATUS USING THIS OPTICAL DISC

(75) Inventors: Yuji Nagai, Kawasaki (JP); Chosaku Noda, Kawasaki (JP); Akihito Ogawa, Kawasaki (JP); Kazuto Kuroda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 644 days.

(21) Appl. No.: 10/762,001

(22) Filed: Jan. 22, 2004

(65) Prior Publication Data

US 2006/0133228 A1   Jun. 22, 2006

(30) Foreign Application Priority Data

Jan. 23, 2003   (JP)   ............... 2003-015019

(51) Int. Cl.
*G11B 7/24* (2006.01)
*G11B 5/09* (2006.01)

(52) U.S. Cl. ............... 369/275.3; 369/275.1; 369/59.25; 369/59.1

(58) Field of Classification Search ............ None
See application file for complete search history.

(56) References Cited

U.S. PATENT DOCUMENTS 6,201,773 B1   3/2001   Aoki

2004/0105365 A1 *   6/2004   Furumiya et al. ........ 369/47.22

FOREIGN PATENT DOCUMENTS

| JP | 2002-279645 | 9/2002 |
|----|---|---|
| JP | 2002-342943 | 11/2002 |
| WO | WO 03/079335 | 9/2003 |

OTHER PUBLICATIONS

"Data Interchange on 120 mm and 80 mm Optical Disk using +RW Format- Capacity: 4,7 and 1,46 Gbytes per Side", STANDARD ECMA-337, ECMA International Standardizing Information and Communication Systems, Dec. 2002, pp. 27-31.

* cited by examiner

*Primary Examiner*—Muhammad Edun
(74) *Attorney, Agent, or Firm*—Oblon, Spivak, McClelland, Maier & Neustadt, P.C.

(57) ABSTRACT

Address information is formed by M wobbles (integer M is the number of wobble waves) per bit as a basic unit, and is NRZ-recorded. Also, a sync signal used in sync detection of the address information is formed by N wobbles per bit as a basic unit (integer N is the number of wobble waves and M=2N). The sync signal with such configuration (6 wobbles per bit) is recorded on the head side of the address information (12 wobbles per bit). In this way, even when external noise is large, a modulated wobble signal can be demodulated more accurately.

5 Claims, 12 Drawing Sheets

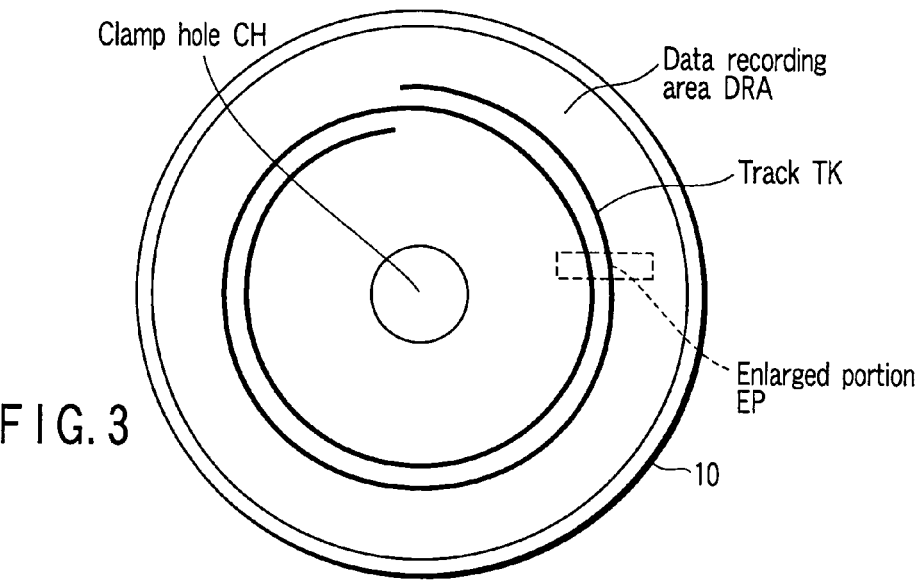
FIG. 3
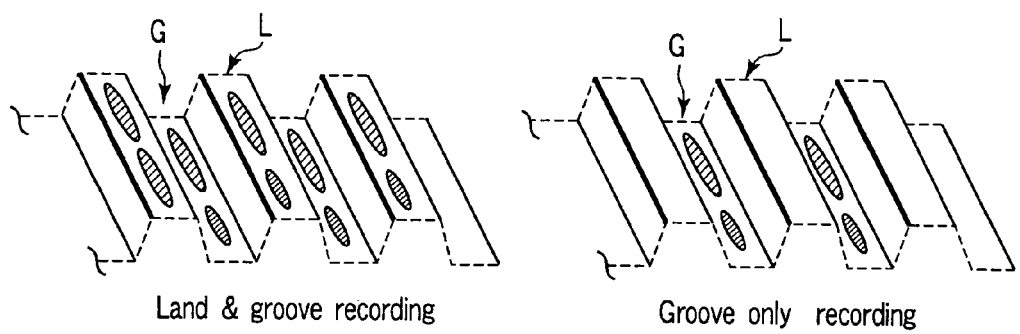
Land & groove recording
FIG. 4A
Groove only recording
FIG. 4B
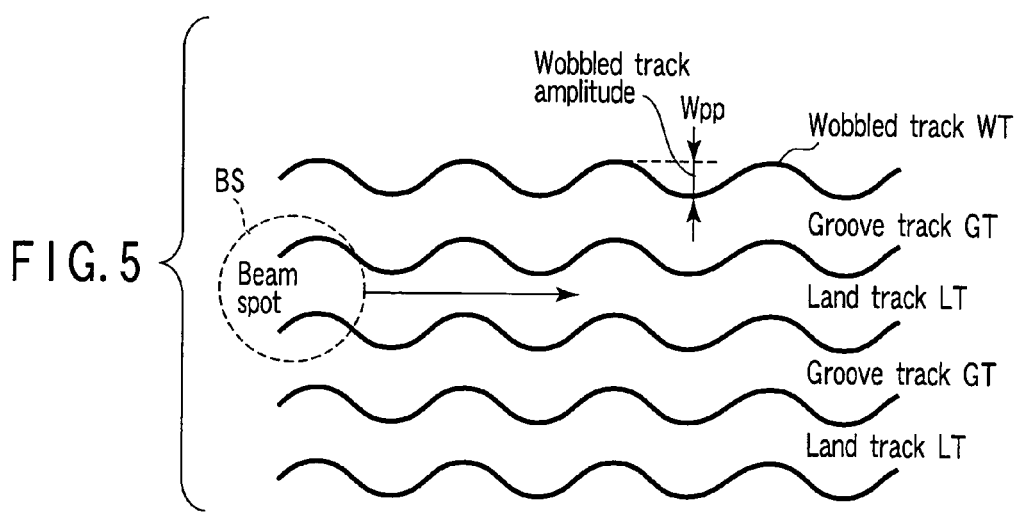
FIG. 5

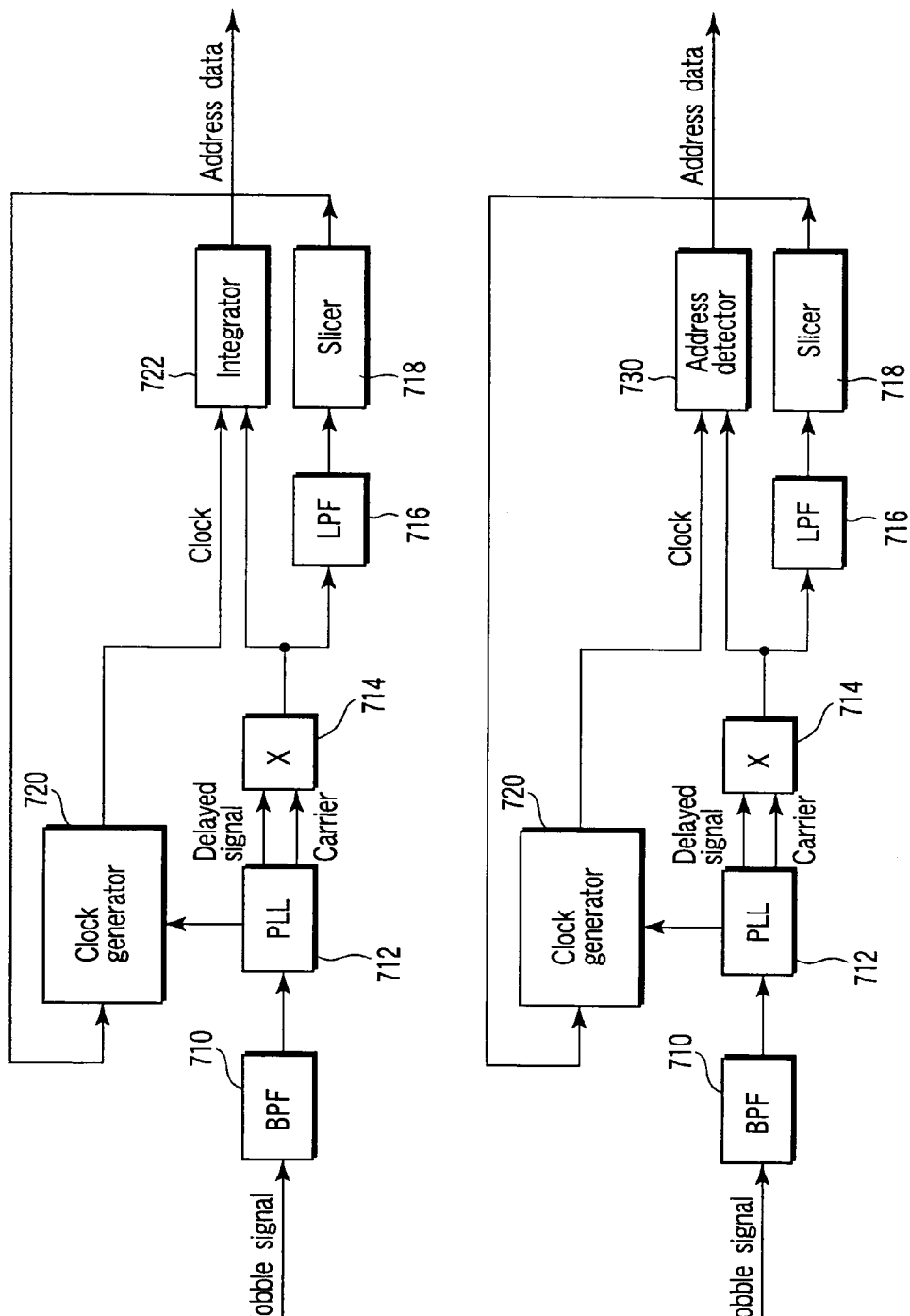
F I G. 11   F I G. 17

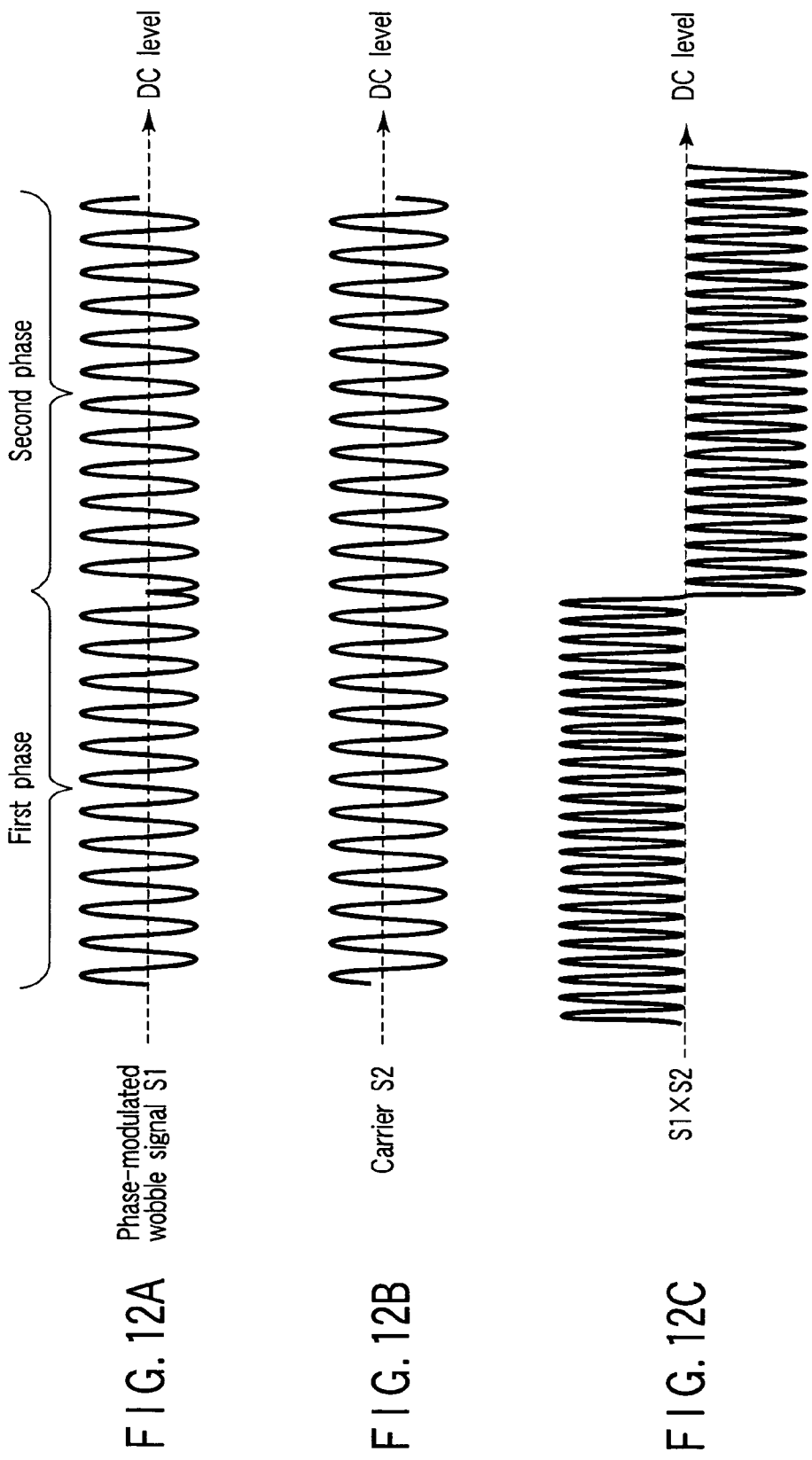

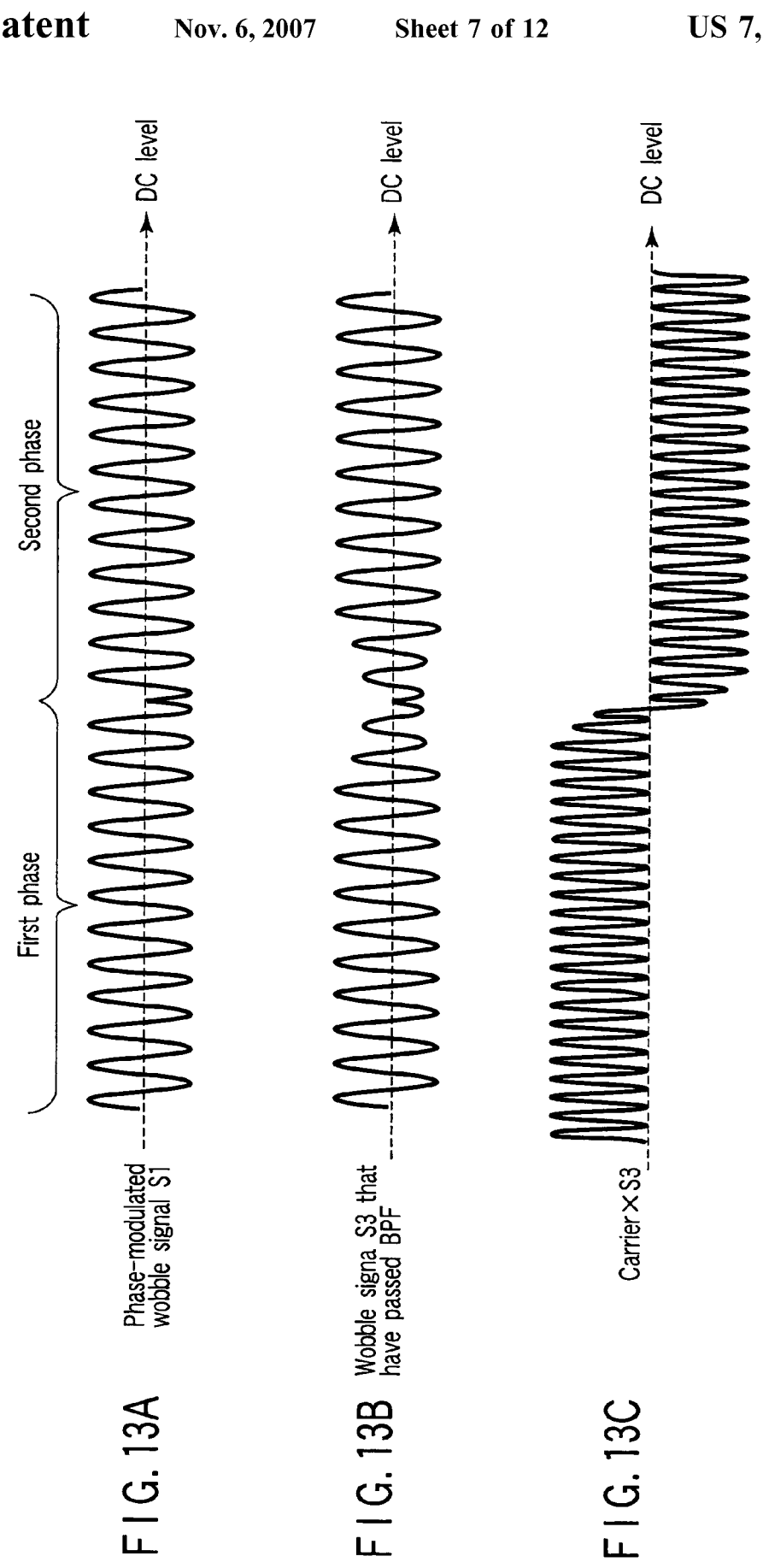

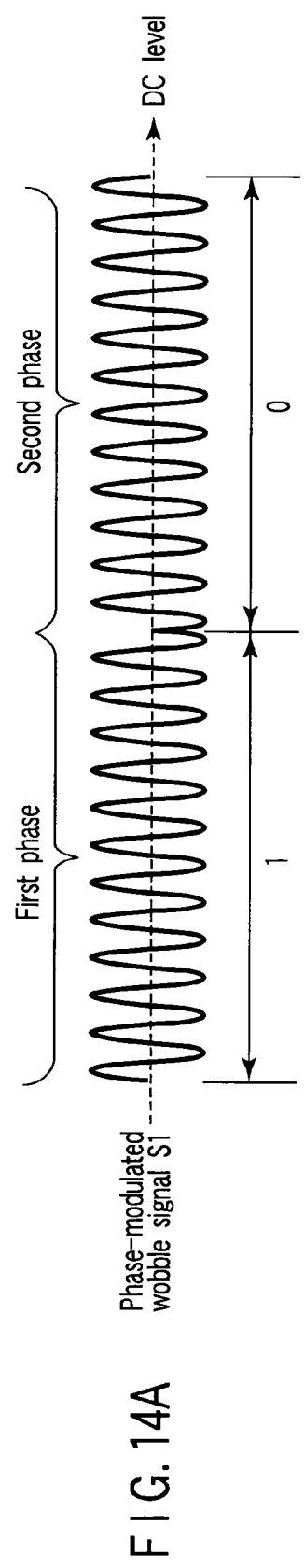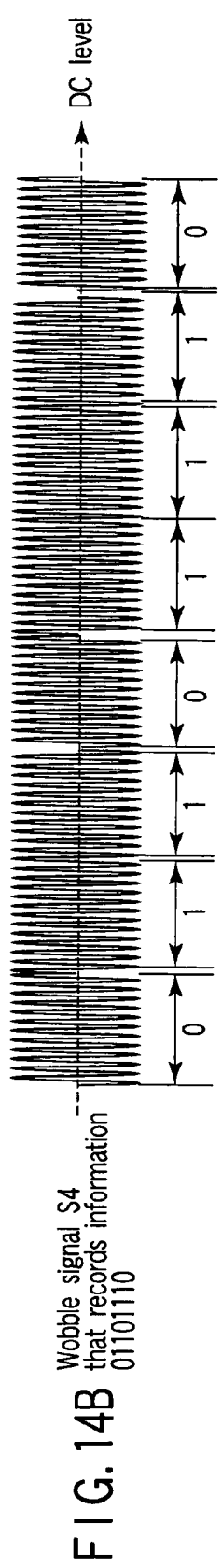
FIG. 14A Phase-modulated wobble signal S1
FIG. 14B Wobble signal S4 that records information 01101110

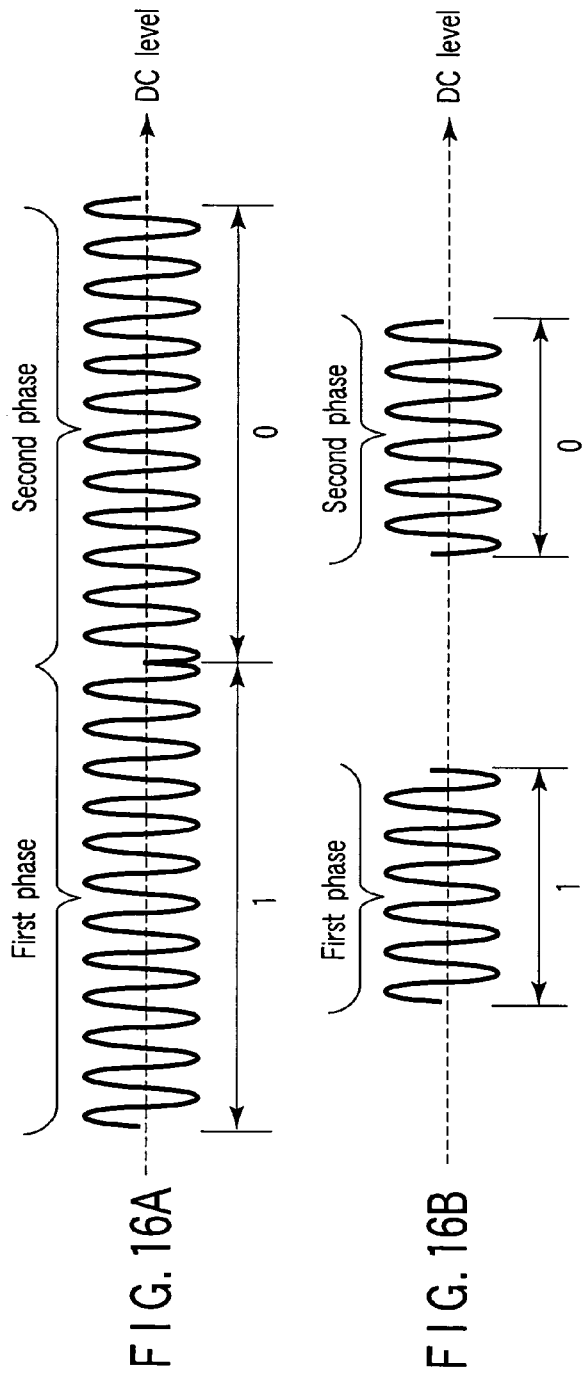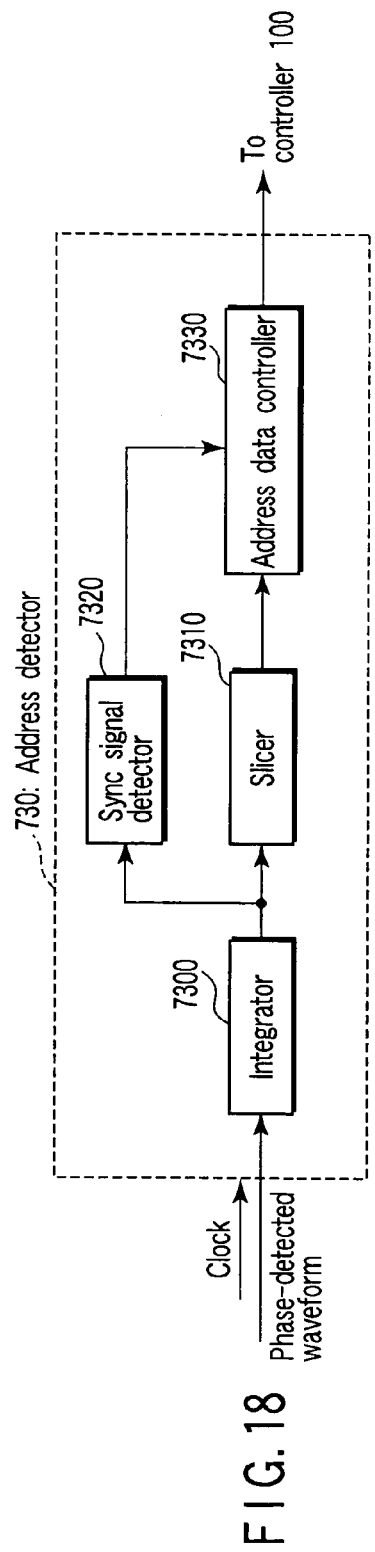

OPTICAL DISC WITH WOBBLED TRACKS AND APPARATUS USING THIS OPTICAL DISC

CROSS-REFERENCE TO RELATED APPLICATIONS

This application is based upon and claims the benefit of priority from the prior Japanese Patent Application No. 2003-015019, filed Jan. 23, 2003, the entire contents of which are incorporated herein by reference.

BACKGROUND OF THE INVENTION

1. Field of the Invention

The present invention relates to an optical disc having wobbled tracks, and an apparatus (recording/reproduction apparatus, mastering apparatus, or the like) or method using this optical disc.

2. Description of the Related Art

As is well known, in recent years, optical discs having a single-layer/single-sided size of 4.7 GB are commercially available as those which can achieve high-density recording of information. For example, a DVD-ROM is available as a read-only optical disc, and a DVD-RAM, DVD-RW, DVD+RW, and the like are available as rewritable discs. Also, a DVD-R is available as a "write-once" optical disc.

On these optical discs, an information recording layer is formed on a transparent substrate, and information is recorded/reproduced by focusing a laser beam on that layer. As information recording/reproduction means for rewritable optical discs, an information recording layer of such optical disc has a guide groove called a "groove". Recording/reproduction of information on/from a rewritable optical disc is made along this guide groove. Furthermore, this optical disc is formed with physical addresses used to specify spatial positions where information is to be recorded/reproduced.

As formation means of the physical addresses, a DVD-RAM uses intermittent three-dimensional patterns called prepits on a substrate. By contrast, a +RW disc adopts groove wobble modulation (to be referred to as wobble modulation hereinafter) that radially slightly wobbles the guide groove. The physical addresses formed by wobble modulation can assure a broad recording area for user information (i.e., high format efficiency) and can easily take compatibility to read-only media, since they do not obstruct recording tracks (unlike the prepits).

As a prior art that forms physical addresses by wobble modulation, Jpn. Pat. Appln. KOKAI Publication No. 2002-279645 (FIGS. 4 and 5; paragraph Nos. 0029 and 0030) is known.

In this reference, physical addresses are formed by wobble phase modulation, and one address bit is made up of a modulation unit for four wobbles, and a monotone unit for 38 wobbles. More specifically, let + be +90° modulation, and − be −90° modulation. Then, wobbles modulated by ++−− and monotone wobbles +++ . . . +++ express "0", and wobbles modulated by −−++ and monotone wobbles +++ . . . +++ express "1". In order to read each address, the address start position must be detected, and 1 bit of a sync signal for this purpose is formed by 42 wobbles like an address bit.

Upon demodulating a phase-modulated wobble signal, the frequency band must be limited using, e.g., a band-pass filter to reduce the influence of disturbance noise other than the wobble signal. However, when a wobble signal is phase-modulated, a frequency in a frequency band different from that of the wobble signal is present at a phase change point. For this reason, at the phase change point (having a frequency component higher than the wobble signal frequency) of the wobble signal that has passed the band-pass filter, the amplitude attenuates depending on the filter characteristics. This amplitude attenuation becomes disturbance upon demodulation.

Therefore, in order to attain more accurate demodulation, modulation is preferably made to minimize occurrence of phase change points. However, in a conventional system that records physical addresses by wobble phase modulation, the wobble phase is inverted a plurality of times in one address bit so as to express the address symbol. When such modulation method is used, if external noise increases due to track pitch narrowing, demodulation errors are more likely to occur.

BRIEF SUMMARY OF THE INVENTION

In a wobble modulation method according to an embodiment of the present invention, address information is formed by M wobbles (integer M is the number of wobble waves) per bit as a basic unit, and is NRZ-recorded. Address information means not only address itself but also error detection or collection codes for it and address information transformed with modulation table or gray-code rule. An optical disc according to an embodiment of the present invention records the address information by such method.

A sync signal used in sync detection of the address information is formed by N wobbles per bit as a basic unit (integer N is the number of wobble waves, and M=2N). An optical disc according to an embodiment of the present invention records the sync signal formed by such method on the head side of the address information.

Note that the sync signal can include a symbol sequence as a run of odd-numbered "0"s or "1"s as a symbol sequence which is not present in the address information.

An apparatus for reproducing the optical disc can comprise a dedicated detection circuit for detecting the sync signal.

With the arrangement according to the above embodiment, the number of times of phase inversion which inevitably occurs in the demodulation process of the wobble-modulated (phase-modulated) address information or sync signal can become smaller than the conventional method. Hence, even when external noise is large, the phase-modulated wobble signal can be demodulated more accurately (than in a case without using the present invention).

Therefore, when an optical disc that records the sync signal/address information, which is wobble-modulated by the method according to the present invention, is used, even when the external noise susceptibility relatively increases due to an increase in recording density, a rewritable (or write-once) optical disc from which the physical address can be detected more accurately can be obtained. In an apparatus using such optical disc, detection errors of the sync signal/address information can be reduced.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a schematic view for explaining the arrangement of an optical disc as an example of a recordable/reproducible information recording medium to which the present invention can be applied;

FIGS. 4A and 4B show examples of the structures of enlarged portion EP of track TK formed on optical disc 10 shown in FIG. 3;

FIG. 5 is a view for explaining a state wherein laser beam spot BS travels on track TK (an example of wobbled track WT which has wobbles of amplitude Wpp and is formed as groove track GT and land track LT) formed on optical disc 10 in FIG. 3;

FIG. 11 is a block diagram for explaining an example of a demodulation circuit which demodulates recorded information (a sequence of bits 0 or 1 corresponding to address information AI, the reproduction timing of which is determined by detecting sync signal SYNC in FIG. 10) from a wobble signal, which is phase-modulated, as shown in, e.g., FIG. 8 (or FIGS. 14A and 14B, or FIGS. 16A and 16B);

FIGS. 12A, 12B, and 12C are charts for explaining a signal waveform that indicates a phase change point (which serves as information used to obtain the integration timing required to detect address data) of wobbles, which is obtained based on the product of wobble signal S1 (delayed as needed to adjust the timing with carrier S2) and wobble carrier S2 input to the demodulation circuit in, e.g., FIG. 11;

FIGS. 13A, 13B, and 13C are charts for explaining a state wherein a signal waveform that indicates a phase change point (which serves as information used to obtain the integration timing required to detect address data) of wobbles, which is obtained based on the product of wobble signal S1 (delayed as needed to adjust the timing with carrier S2) and wobble carrier S2 input to the demodulation circuit in, e.g., FIG. 11 blunts via a BPF;

FIGS. 14A and 14B are charts showing examples of wobble signal waveforms (FIG. 14B exemplifies a state wherein no phase inversion takes place between bits "11" and "111" upon recording "01101110") when non-return-to-zero (NRZ) recording is used as wobble recording so as to reduce the frequency of occurrence of a signal waveform, which blunts at the phase change point, as shown in, e.g., FIG. 13C, upon demodulating recorded information (a sequence of bits 0 or 1) from the phase-modulated wobble signal;

FIGS. 16A and 16B are charts showing an example of the relationship between a wobble signal and symbol in an address data field and that between a wobble signal and symbol in a sync signal field when NRZ recording is used in wobble recording that exploits phase modulation;

FIG. 17 is a block diagram showing another example of a demodulation circuit which demodulates recorded information (a sequence of bits 0 or 1 corresponding to address information AI, the reproduction timing of which is determined by detecting sync signal SYNC in FIG. 10) from a wobble signal, which is phase-modulated, as shown in, e.g., FIGS. 16A and 16B (or FIG. 8 or FIGS. 14A and 14B);

FIG. 18 is a block diagram for explaining a practical example of address detector 730 in FIG. 17;

DETAILED DESCRIPTION OF THE INVENTION

An embodiment of the present invention will be described in detail hereinafter with reference to the accompanying drawings.

[Basic Description of Optical Disc Apparatus]

Figure 1:
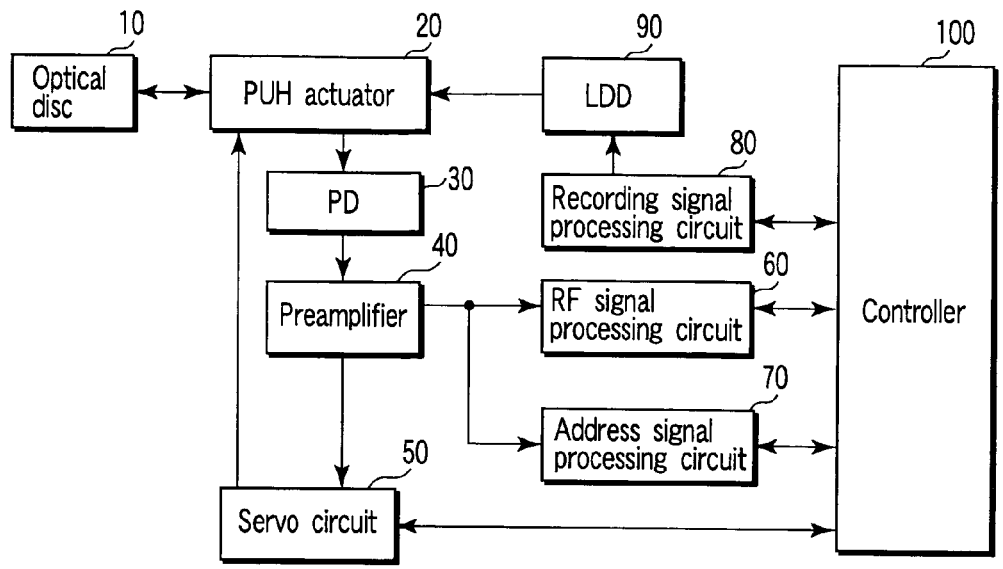
FIG. 1 is a block diagram for explaining an example of the arrangement of an optical disc recording/reproduction apparatus according to an embodiment of the present invention.

FIG. 1 is a block diagram for explaining an example of the arrangement of an optical disc apparatus (recording/reproduction apparatus) according to an embodiment of the present invention. When optical disc 10 is loaded into this apparatus, an optical head (not shown) can be moved by actuator 20 to a predetermined position on the recording surface of optical disc 10. This apparatus records/reproduces information by focusing a laser beam emitted by the optical head on an information recording layer of optical disc 10.

More specifically, a laser beam reflected by optical disc 10 passes through an optical system (not shown) of the optical head again, and is detected as an electrical signal by photodetector (PD) 30. The light-receiving surface of PD 30 is split into two or more regions. A signal obtained by summing up the voltage values detected by respective light-receiving elements is output as sum signal SS, and a signal obtained by calculating their difference is output as difference signal DS. Especially, sum signal SS appended with RF information such as user information or the like is called an RF signal. Also, a signal obtained by calculating the difference between the voltage values detected by respective light-receiving elements which are optically arranged in the radial direction of optical disc 10 is called a radial push-pull signal.

The signals output from PD 30 are appropriately amplified by preamplifier 40, and are sent to servo circuit 50, RF signal processing circuit 60, and address signal processing circuit 70. Address signal processing circuit 70 reads out physical address information indicating the recording position on optical disc 10 by processing the signals detected by PD 30, and outputs that information to controller 100. Controller 100 makes management for reading out information (user information or the like) from a desired position or recording (user information or the like) at a desired position on the basis of this address information.

Servo circuit 50 executes servo control (tracking servo, focusing servo, and the like) via actuator 20 using sum signal SS and difference signal DS from preamplifier 40 as needed, so that the optical head can accurately trace on a desired track of optical disc 10. This servo control is executed under the control of controller 100. An RF signal (sum signal SS) obtained when the optical head accurately traces on a desired track of optical disc 10 under this servo control is processed by RF signal processing circuit 60 under the control of controller 100, thus extracting user information and the like recorded on optical disc 10.

On the other hand, a radial push-pull signal (difference signal DS) obtained when the optical head accurately traces on a desired track of optical disc 10 under this servo control is processed by address signal processing circuit 70 under the control of controller 100, thus extracting physical address information and the like recorded on optical disc 10. This physical address information indicates the current location of the beam spot on the recording surface, and is used not only in a reproduction mode but also upon determining an information recording start position on optical disc 10 (in a recording mode). When the beam spot position is specified based on this physical address information, controller 100 notifies servo circuit 50 of a position (recording start position) to which the optical head is to be moved, and drives laser diode (LDD) 90 via recording signal processing circuit 80. Laser beam pulses from LDD 90 strike a predetermined position (corresponding to the physical address to be recorded) of optical disc 10 via the optical system of the optical head, which undergoes the servo control. In this manner, information is recorded on optical disc 10.

Figure 2:
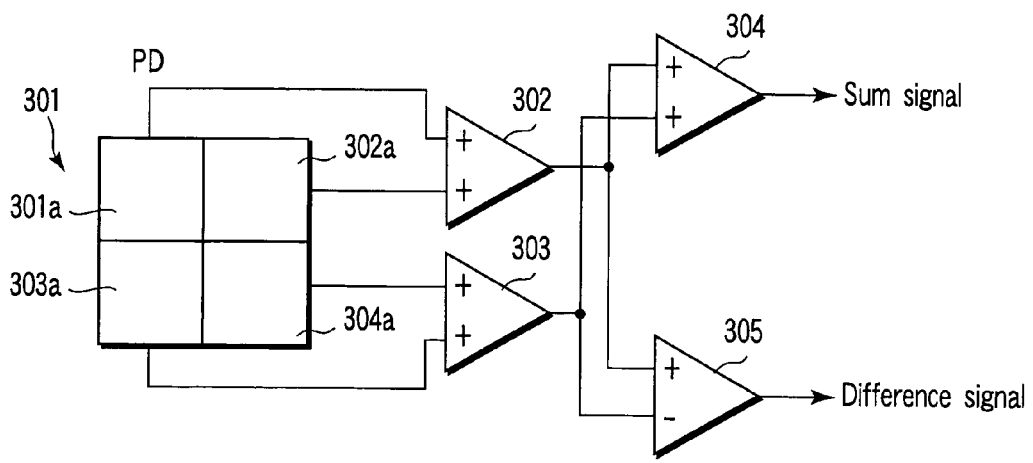
FIG. 2 is a diagram for explaining a practical example of photodetector 30 in FIG. 1.

FIG. 2 shows a practical example of photodetector 30 in FIG. 1. FIG. 2 exemplifies a photodetector (PD), light-receiving surface 301 of which is split into four, as PD 30. Detected voltages of first and second light-receiving surfaces 301a and 302a of the 4-split light-receiving surface are amplified by addition amplifier 302. Also, detected voltages of third and fourth light-receiving surfaces 303a and 304a of the 4-split light-receiving surface are amplified by addition amplifier 303. The outputs from amplifiers 302 and 303 are further amplified by addition amplifier 304 to obtain sum signal SS. The outputs from amplifiers 302 and 303 are differentially amplified by differential amplifier 305 to obtain difference signal DS. That is, a signal obtained by summing up the detected voltages of all the four light-receiving elements of 4-split PD 30 is output as sum signal SS, and a result obtained by calculating the difference between the sums of the detected voltages from each two light-receiving elements is output as difference signal DS. The electrical signals (sum signal SS and difference signal DS) detected in this way are amplified by preamplifier 40, and are output to servo circuit 50, RF signal processing circuit 60, and address signal processing circuit 70.

[Description of Optical Disc and Land/groove Recording]

FIG. 3 is a schematic view for explaining the arrangement of optical disc 10 as a recordable/reproducible information recording medium to which the present invention can be applied. Optical disc 10 according to an embodiment of the present invention has a guide groove called a groove on data recording area DRA (an information recording area of an information recording layer) formed on a transparent substrate. A three-dimensional structure formed by forming this guide groove is called a track, and information recording/reproduction is done along this track TK. Note that this track includes a spiral track which is continuously formed from the inner periphery to the outer periphery, as shown in FIG. 3, and concentric tracks formed of a plurality of concentric tracks.

FIGS. 4A and 4B show examples of the structures of enlarged portion EP of track TK formed on optical disc 10 in FIG. 3. This track is formed by convex and concave portions of the information recording layer, one of which is called a groove (G) and the other of which is called a land (L). On a DVD-RAM, information is recorded as recording marks on both land L and groove G, as shown in FIG. 4A. On the other hand, on a DVD+RW or the like, information is recorded as recording marks on only groove G, as shown in FIG. 4B. The present invention can be applied to either FIG. 4A or 4B.

[Description of Relationship Between Wobble Signal and Push-pull]

FIG. 5 is a view (top view of a track) for explaining a state wherein laser beam spot BS travels on track TK (an example of wobbled track WT which has wobbles of amplitude Wpp and is formed as groove track GT and land track LT) formed on optical disc 10 in FIG. 3. The track of optical disc 10 according to an embodiment of the present invention slightly wobbles in the radial direction. Such track is called a wobbled track (WT). Upon scanning focused beam spot BS along this wobbled track WB, beam spot BS nearly goes straight along the center of the wobbled track since the frequency of wobbles is higher than the frequency band of a tracking servo signal. At this time, sum signal SS in FIG. 2 remains nearly unchanged, and difference signal DS in the radial direction, i.e., only the radial push-pull signal changes in correspondence with wobbles. This signal is called a wobble signal. This wobble signal is used in adjustment (rotary servo control) of the rotation frequency of a spindle (not shown) for rotating optical disc 10, reference of recording clocks, physical address information, and the like.

Figure 6A:
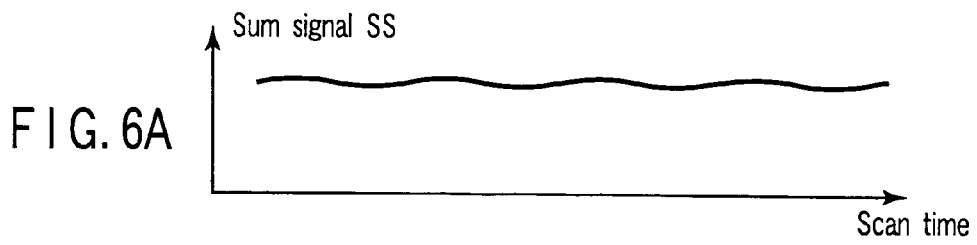
FIGS. 6A and 6B show examples of waveforms of sum signal SS and difference signal DS (radial push-pull signal corresponding to wobbles in FIG. 5) output from photodetector 30 with the arrangement in, e.g., FIG. 2 upon traveling of the beam spot shown in, e.g., FIG. 5.
Figure 6B:
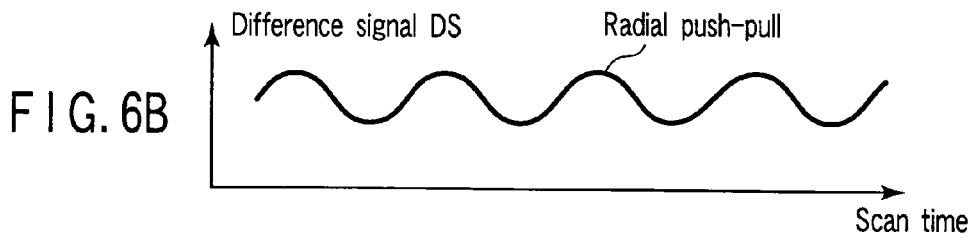

FIGS. 6A and 6B exemplify the waveforms of sum signal SS and difference signal DS (radial push-pull signal corresponding to wobbles in FIG. 5) obtained from photodetector 30 with the arrangement shown in, e.g., FIG. 2, upon traveling of beam spot BS shown in, e.g., FIG. 5.

[Description of Wobble Signal]

On optical disc 10 according to an embodiment of the present invention, physical address information, which indicates a physical position on an information recording area of the optical disc, is recorded by modulating the wobble signal. In this recording, two different modulation methods may be used. That is, physical address information can be recorded by frequency- or phase-modulating wobbles to be given to tracks TK.

Figure 7:
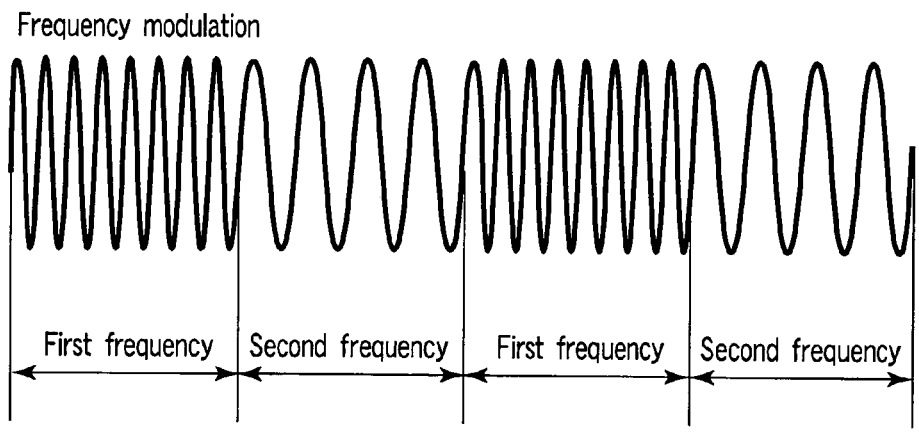
FIG. 7 shows an example of a waveform (that of wobbles themselves) when wobbled track WT in, e.g., FIG. 5 (track TK in FIG. 3) has been frequency-modulated (wobble-modulated) in correspondence with its recorded information (bits 0 or 1)

FIG. 7 exemplifies a waveform (that of wobbles themselves) when wobbled track WT in FIG. 5 (track TK in FIG. 3) is frequency-modulated (wobble-modulated) in correspondence with its recorded information (bits 0 or 1). Also, FIG. 8 exemplifies a waveform (that of wobbles themselves)

when wobbled track WT in FIG. 5 (track TK in FIG. 3) is phase-modulated (wobble-modulated) in correspondence with its recorded information (bits 0 or 1). The present invention uses phase modulation in place of frequency modulation.

Figure 9:
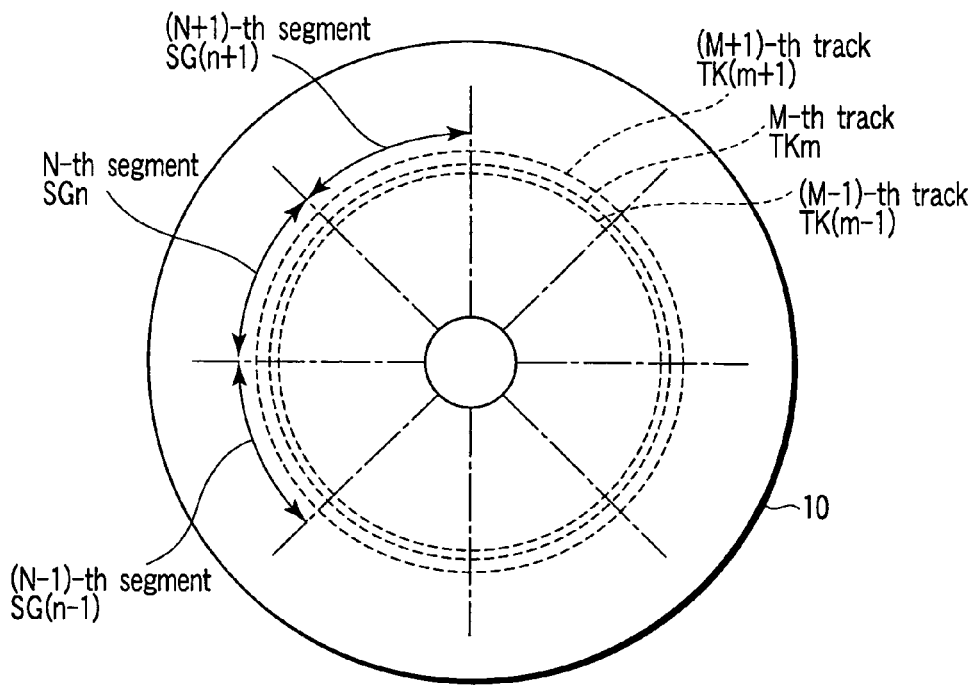
FIG. 9 shows an example of the configuration of data recording area DRA (segmented track TK) of optical disc 10 in, e.g., FIG. 3.

FIG. 9 exemplifies the configuration of data recording area DRA of optical disc 10 in, e.g., FIG. 3 (an information recording area of an optical disc having segmented track TK). In order to specify a physical position on data recording area DRA (information recording area) on optical disc 10 according to an embodiment of the present invention, track number (Tkm) and segment number (SGn) are used, as shown in FIG. 9. This embodiment adopts a configuration that can specify the radial position by giving track numbers (Tkm−1, Tkm, Tkm+1, . . . ) in turn to track TK, and can specify the tangential position by giving segment numbers (SGn−1, SGn, SGn+1, . . . ) to a plurality of segments obtained by segmenting track TK. At this time, address information as position information can be recorded once or a plurality of times by modulating wobbles in, e.g., one segment.

Figure 8:
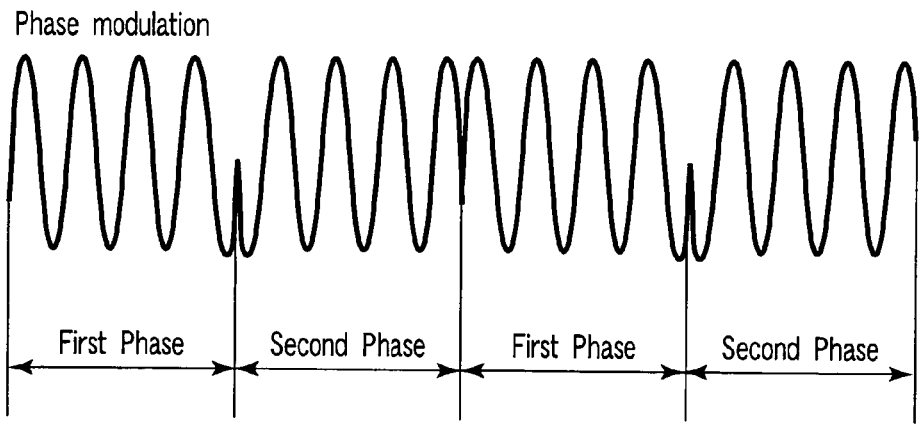
FIG. 8 shows an example of a waveform (that of wobbles themselves) when wobbled track WT in, e.g., FIG. 5 (track TK in FIG. 3) has been phase-modulated (wobble-modulated) in correspondence with its recorded information (bits 0 or 1)
Figure 10:
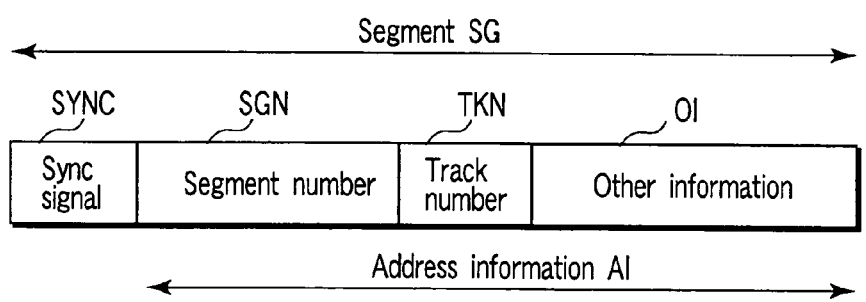
FIG. 10 is a view for explaining an example of the format (corresponding to each segment SG in FIG. 9 in this example) of sync signal SYNC and address information AI recorded on wobbled track WT by wobble modulation shown in, e.g., FIG. 8.

FIG. 10 exemplifies the format (corresponding to each segment SG in FIG. 9 in this example) of sync signal SYNC and address information AI recorded on wobbled track WT by wobble modulation shown in, e.g., FIG. 8. Upon reproducing address information, sync signal SYNC is required to detect the start position of address information AI. Sync signal SYNC in FIG. 10 is used in timing generation or the like upon reproducing address information AI.

In the format shown in FIG. 10, the relationship between the locations of sync signal SYNC and address information AI is as shown in FIG. 10. However, the locations of the contents (segment number SGN, track number TKN, and other information OI) in address information AI are not limited to those shown in FIG. 10, and may be changed as needed.

[Description of Phase Modulation Method]

FIG. 11 is a block diagram for explaining an example of a demodulation circuit which demodulates recorded information from a wobble signal, which is phase-modulated, as shown in, e.g., FIG. 8 (or FIGS. 14A and 14B, or FIGS. 16A and 16B). The recorded information in FIG. 11 corresponds to a sequence of bits 0 or 1 corresponding to address information AI, the reproduction timing (head position) of which is determined by detecting sync signal SYNC in FIG. 10. The physical address information recorded on optical disc 10 according to an embodiment of the present invention can be read using the demodulation circuit with the arrangement shown in, e.g., FIG. 11.

A wobble signal input to the demodulation circuit in FIG. 11 contains noise unique to a medium (optical disc 10), noise due to crosstalk from neighboring tracks, and the like. Hence, noise components other than the frequency band of the input wobble signal are removed via, e.g., band-pass filter (BPS) 710 and the like. The noise-removed wobble signal is input to phase-locked loop circuit (PLL) 712 to generate a carrier. PLL 712 outputs a carrier (corresponding to S2 in FIG. 12B), and a wobble signal (delayed signal; corresponding to S1 in FIG. 12A) which is delayed in synchronism with this carrier (to match its timing). The carrier (S2) and delayed wobble signal (S1) are multiplied by multiplier 714. A phase change point of the wobble signal (S1) can be detected from a change in level (leading or trailing edge of an envelope) of the product (corresponding to S1×S2 in FIG. 12C). That is, upon demodulating a phase-modulated signal, the polarity of phase can be determined by multiplying the modulated signal and carrier.

FIGS. 12A, 12B, and 12C are charts for explaining a signal waveform that indicates a phase change point (which serves as information used to obtain the integration timing or the like required to detect address data) of wobbles, which is obtained based on the product of wobble signal S1 (delayed as needed to adjust the timing with carrier S2) input to the demodulation circuit in, e.g., FIG. 11, and wobble carrier S2.

The waveform (S1×S2) after multiplication in multiplier 714 is detected in the form which is offset between the first and second phases of wobble signal S, as shown in FIGS. 12A and 12C. Hence, threshold value detection is made using a waveform (corresponding to the envelope of waveform S1×S2 after multiplication) obtained by removing high-frequency components from the waveform (S1×S2) after multiplication using, e.g., low-pass filter (LPF) 716 or the like (or integration detection is directly made), thus decoding address data.

In the arrangement shown in FIG. 11, slicer 718 extracts a waveform indicating the phase change timing (corresponding to an envelope change point of waveform S1×S2 after multiplication) of the wobble signal from the waveform (S1×S2) after multiplication from which high-frequency components have been removed, and feeds it back to clock generator 720. Clock generator 720 detects the clock generation timings (timings at which clocks are to be generated) on the basis of the waveform from slicer 718, and generates integration clocks at predetermined timings using carrier S2 (whose jitter has been suppressed by the PLL operation) from PLL 712. By inputting the integration clocks and the product (S1×S2) from multiplier 714 to integrator 722, address data contained in the wobble signal is modulated ("1"s or "0"s corresponding to the first or second phase of FIG. 12A are demodulated by integrating the product at clock timings).

[Description of Amplitude Attenuation at Phase Change Point]

Amplitude attenuation at a phase change point will be described below. FIGS. 13A, 13B, and 13C are charts for explaining a state wherein a signal waveform that indicates a phase change point of wobbles, which is obtained based on the product of wobble signal S1 and wobble carrier S2 input to the demodulation circuit in, e.g., FIG. 11, blunts via a BPF. The envelope change point of the blunted portion of the waveform readily fluctuates due to the influences of noise and jitter contained in the wobble signal and attributes one of causes of the address detection precision drop.

As described above, upon demodulating the phase-modulated wobble signal, the frequency band must be limited using, e.g., a band-pass filter or the like to reduce the influence of external noise other than the wobble signal. However, when the wobble signal is phase-modulated, a frequency in a frequency band different from that of the wobble signal is present at the phase change point (e.g., a frequency component of 1.4 MHz is generated at the phase change point with respect to the wobble frequency of 700 kHz). For this reason, amplitude attenuation shown in, e.g., FIG. 13B occurs at the phase change point of the wobble signal which has passed the band-pass filter. Upon occurrence of this amplitude attenuation, the symbol boundary becomes ambiguous upon multiplying the wobble signal and carrier. Such ambiguous symbol boundary poses adverse influences (e.g., symbol errors readily occur) upon increase in external noise. Therefore, in order to attain more accurate demodulation, modulation is preferably made to minimize occurrence of phase change points.

Hence, the present invention focuses on "modulation to minimize occurrence of phase change points".

[Description of Modulation Method]

An example of a modulation method for solving the aforementioned problem (the adverse influence (e.g., symbol errors readily occur) upon increase in external noise) will be described below.

FIGS. 14A and 14B exemplify wobble signal waveforms (FIG. 14B exemplifies a state wherein no phase inversion takes place between bits "11" and "111" upon recording "01101110") when non-return-to-zero (NRZ) recording is used as wobble recording so as to reduce the frequency of occurrence of a signal waveform, which blunts at the phase change point, as shown in, e.g., FIG. 13C, upon demodulating recorded information (a sequence of bits 0 or 1) from the phase-modulated wobble signal.

In the example shown in FIGS. 14A and 14B, 12 waves form one bit. That is, in the example of FIGS. 14A and 14B, modulation is made so that wobble signals of the first phase that successively appear for 12 waves form a symbol "1", and wobble signals of the second phase that successively appear for 12 waves form "0". Such modulation corresponds to NRZ recording using 12 waves as one unit.

NRZ recording is a method of recording two pieces of bit information 1 and 0 in correspondence with two states (first and second phases in this embodiment) as they are. NRZ recording is one of recording methods that can minimize phase change points, since no state change occurs within 1 bit. "Modulation that minimizes occurrence of phase change points" as the focus of the present invention can be achieved using NRZ recording.

In the example of FIGS. 14A and 14B, 12 waves form 1 bit. However, the number of waves changes depending on the address information size to be recorded and the S/N ratio of the wobble signal (the ratio of wobble signal power to noise power). As the address information size to be recorded increases, the number of waves per bit decreases. On the other hand, in an optical disc system which suffers large noise power, the number of waves per bit must be increased. Even in such case, NRZ recording can be used.

Figure 15:
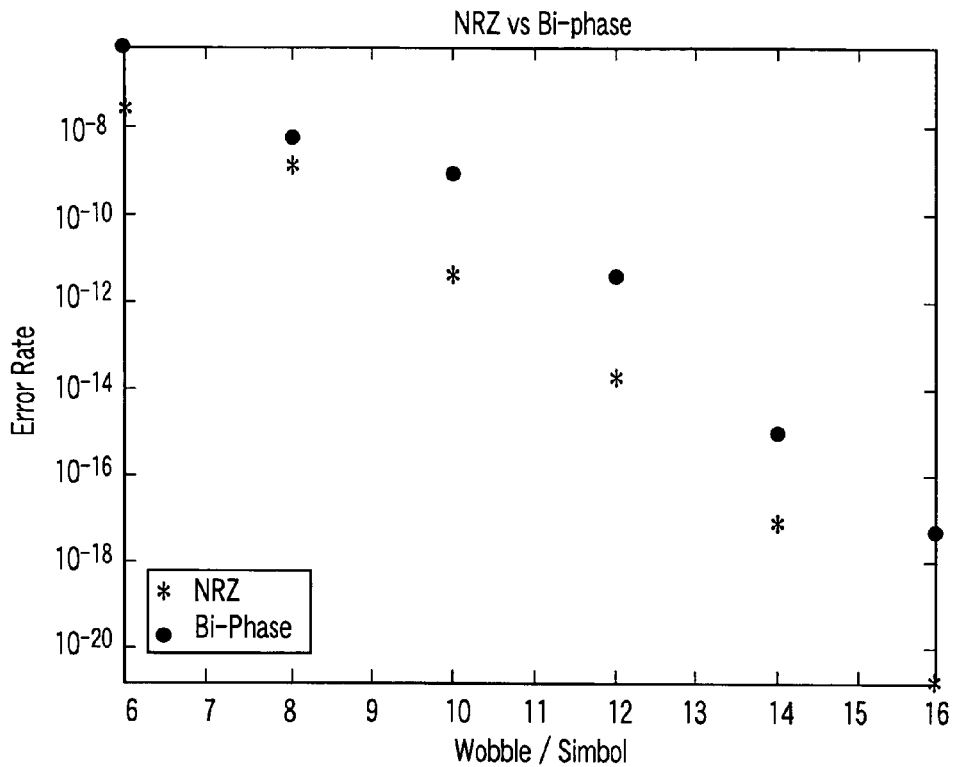
FIG. 15 is a graph showing an example of the difference between error rates of NRZ recording and Bi-phase recording used as wobble recording.

FIG. 15 is a graph showing an example of the difference between error rates of NRZ recording and Bi-phase recording used as wobble recording (example of comparison between the demodulation error rate of a wobble signal phase-modulated by NRZ recording, and that of a wobble signal phase-modulated by Bi-phase recording). Note that Bi-phase recording is a recording method that expresses symbol "0" by wobbles modulated by "+−" and symbol "1" by wobbles modulated by "−+" if "+" represents the first phase and "−" represents the second phase. The abscissa in FIG. 15 plots the number of wobble waves used to express 1 address bit. For example, in case of 8 wobbles/symbol, NRZ recording records "1" by ++++++++ and "0" by −−−−−−−− and Bi-phase recording records "1" by −−−−++++ and "0" by ++++−−−−.

As can be seen from FIG. 15, the demodulation error rate becomes better with increasing number of wobble waves that express 1 bit. Upon comparison between NRZ recording and B-phase recording, NRZ recording can assure a better demodulation error rate. Hence, the demodulation error rate becomes better with decreasing number of phase changes (with increasing phase inversion interval).

Also, a length per wobble wave is one of important factors. The wobble signal is used to generate write clocks required to record user data as mark spaces in addition to recording of address information. For this reason, if the length per wave becomes too large compared to the user bit length, jitter of write clocks becomes large, thus disturbing normal recording. On the other hand, if the length per wave is too short, noise power increases since the wobble frequency approaches the frequency band of user data recorded on the self and neighboring tracks. Thus, it is desirable to record wobbles at a frequency about 1/30 to 1/200 of the channel frequency used to record user data. For example, when the channel frequency is 64.8 MHz, the wobble frequency of about 700 Hz is preferably used.

[Description of Sync Signal]

As shown in FIG. 10, the sync signal need be recorded to detect the start position of address information upon reading the address information. This sync signal must be modulated using a pattern which is not recorded in the address information field so as to prevent a detection error of the address information start position. That is, when address information is NRZ-recorded, the sync signal must be formed to contain successive symbols longer than the longest pattern of the address information field or to contain successive symbols shorter than the shortest pattern by limiting the runlength of symbols (runlength limited: RLL). Note that RLL is to limit the length of a run of identical symbols that appear successively in bits to be recorded. For example, (1, 2)RLL means that the minimum runlength of identical symbols is limited to 2, and the maximum runlength of identical symbols is limited to 3. More specifically, (1, 2)RLL can assure only 00, 11, 000, and 111. The RLL can be implemented by giving "some redundant bits" to a bit sequence to be actually recorded, and preparing a modulation table.

[Example of Sync Signal]

(a) When Address Information is Recorded by NRZ as Minimum-Runlength-Limited (RLL) Sequence When address information is recorded by NRZ as a minimum-runlength-limited (RLL) sequence, the sync signal is formed to contain successive symbols fewer than the minimum runlength in the address information field. For example, in case of (2, ∞)RLL, the sync signal is formed using symbols such as 010, 101, 0110, 1001, and the like, which never appear in the address information field. More specifically, if the symbol length prepared for the sync signal is 5 bits, a "pattern which is not present in the address information field" like 010101, 10101, 01100, 10010, or the like must be inserted at least once.

(b) When Address Information is Recorded by NRZ as Maximum-Runlength-Limited (RLL) Sequence When address information is recorded by NRZ as a maximum-runlength-limited (RLL) sequence, the sync signal is formed to contain successive symbols more than the maximum runlength in the address information field. For example, in case of (0, 4)RLL, the sync signal is formed using symbols such as 01111110, 10000001, and the like, which never appear in the address information field. In this case as well, the pattern which is not present in the address information field must be inserted at least once.

(c) When Address Information is Recorded by NRZ as Non-Runlength-Limited (RLL) Sequence When address information is recorded by NRZ as a non-runlength-limited (RLL) sequence, the runlength of recording symbols can assume values ranging from 1 to infinity. For this reason, when the number of waves per bit is specified using the same unit as that of the address information field, some symbols of the address information field are likely to be erroneously detected as a sync signal.

Hence, in an embodiment of the present invention, when address information is recorded as a non-RLL sequence, symbols of the sync signal field are formed using the number of waves different from that of the address information field.

More specifically, as shown in FIGS. 16A and 16B, symbols of the sync signal field are formed using ½ of the number of waves of the address information field as a 1-bit unit. For example, when the number of waves of the address information field is 12 per bit, 1 bit of the sync signal field is expressed by 6 waves. This is equivalent to that 11 is detected as 1 and 00 as 0 in the address information field, if the sync signal field is considered as a reference unit.

With the above method, the same effect as that obtained upon adopting RLL can be obtained without any modulation table for address recording. However, when this method is used, since the number of waves per bit of the sync signal field is ½ that of the address information field, the demodulation error rate may impair. Hence, the sync signal field preferably has a relatively large number of bit digits. More specifically, the sync signal field preferably has 10 bits or more as its bit unit (5 bits as a unit of the address information field).

For example, when a non-phase-modulated, single wobble signal has a C/N ratio (Carrier-to-Noise ratio) of 30 dB or less measured in the resolution bandwidth of 10 kHz, and the number of waves per bit of the address information field is 12 and that of the sync signal field is 6, at least 20 bits as a bit unit of the sync signal field are preferably assigned to the number of bit digits of the sync signal. Since the aforementioned modulation method and sync signal field forming means can improve the demodulation error rate of the address information field and can assure a relatively large number of bit digits in the sync signal field, the detection rate of the sync signal can be improved.

In other words, in FIGS. 16A and 16B, when NRZ recording is used as wobble recording using phase modulation, the address information field and sync signal field can be identified more reliably by assigning the number of wobble waves (6 waves in this example) ½ of that (12 waves in this example) used per bit of a symbol in the address information field in, e.g., FIG. 10, to 1 bit of a symbol of the sync signal field in FIG. 10.

Examples of the sync signal using the aforementioned method will be described below.

[Sync Signal Example with Large Number of Times of Symbol Inversion]

The sync signal must contain a larger number of patterns which never appear in the address information field so as to be distinguished from the address information field. In such case, since information is recorded in the address information field using 11 and 00 as basic units, the sync signal preferably contains more patterns 010 and 101, which never appear in the address information field. However, in some systems that make phase demodulation, whether the phase of the carrier output from the PLL is locked to the first or second phase cannot often be detected.

For example, when a binary-phase-modulated signal is frequency-doubled, a non-phase-modulated signal can be generated. When the PLL forms a phase loop on the basis of a frequency-doubled signal of a wobble signal, it outputs a carrier irrespective of phase modulation. Hence, the phase polarity must be determined from the sync signal at that time. For example, if the sync signal is formed of only 0101010101, the polarity and sync signal may be erroneously detected. For this reason, a symbol sequence with a runlength of 1 or more is preferably inserted in the sync signal at least once for the purpose of polarity identification. For example, 0101001010, 0101000101, 0101001101, or the like may be used.

[Sync Signal Example with Small Number of Times of Symbol Inversion]

As described above, the sync signal field records symbols by phase modulation of wobbles as in the address information field. Also, as described above, the amplitude attenuates at the phase change point in the demodulation process. Since the sync signal field undergoes phase modulation using the number of waves half that of the address information field, the number of phase changes increases. For this reason, upon forming the sync signal, patterns which do not appear in the address information field and have a smallest possible number of phase changes are preferably inserted. More specifically, 10001, 01110, 1000001, 0111110, and the like may be used, but the address information field includes patterns 00, 0000, and the like. Compared to the aforementioned patterns, since these patterns are different only for half the number of waves, the inter-symbol distance is shortened. Hence, in order to minimize the number of phase changes and to efficiently use the number of bits, the sync signal is preferably formed to contain 10001 and 01110. More specifically, 0101110101, 0100010101, and the like are preferably used.

[Sync Signal Example with Maximum Hamming Distance and Maximum Number of Phase Changes]

The Hamming distance (H[X, Y]) means the inter-symbol distance. For example, if A=(0, 0, 0) and B=(0, 1, 0), H[A, B]=1; if A=(0, 1, 0) and B=(1, 0, 1), H[A, B]=3. In general, a detection error is harder to occur with increasing Hamming distance between symbols. For this reason, the sync signal is preferably formed of a pattern which has a maximum Hamming distance to all address information field symbols and an out-of-phase sync signal.

There are a plurality of patterns selected under conditions that maximize the Hamming distance. For this reason, in order to narrow down the patterns, a pattern having the smallest number of phase changes is selected from the selected patterns (this method will be described later with reference to FIG. 21). This is because the demodulation error rate becomes better with decreasing number of phase changes, as described above. The pattern selected in this way has characteristics, i.e., the maximum inter-symbol distance and better demodulation error rate (sync signal detection rate) with respect to symbols of the address information field and an out-of-phase sync signal.

[Sync Signal Example with Maximum or Second Maximum Hamming Distance and Minimum Number of Phase Changes]

In addition to the aforementioned sync signal, the following sync signals may be used. Patterns which have a maximum or second maximum Hamming distance from all address information field symbols and an out-of-phase sync signal are selected. By selecting a pattern with a smallest number of phase changes from those patterns, a sync signal pattern can be selected. With this method, the selected pattern may not have a maximum Hamming distance, but a pattern with fewer phase change points can be selected. As a result, the detection rate of the sync signal can be improved.

[Sync Signal Attaching Importance on Number of Phase Changes]

As described above, it is generally desirable to select a sync signal pattern which has a large Hamming distance to all address information field symbols and an out-of-phase sync signal. However, in case of phase modulation, the detection rate can be higher with decreasing number of phase changes. Hence, a high sync signal detection rate is often obtained upon attaching importance on the number of phase changes rather than the Hamming distance. For this reason, as one point of view, the maximum number of times of inversion in the sync signal is preferably suppressed to ⅓ or less the number BD of bit digits of the sync signal.

[Example of Detection of Sync Signal and Address Information]

FIG. 17 is a block diagram for explaining another example of a demodulation circuit which demodulates recorded information from a wobble signal, which is phase-modulated, as shown in, e.g., FIGS. 16A and 16B (or FIG. 8 or FIGS. 14A and 14B). Note that the recorded information corresponds to a sequence of bits 0 or 1 corresponding to address information AI, the reproduction timing (head position) of which is determined by detecting sync signal SYNC in FIG. 10.

The demodulation circuit in FIG. 17 has an arrangement in which address detector 730 replaces integrator 722 in the demodulation circuit in FIG. 11. That is, in the arrangement shown in FIG. 17, a phase-detected signal (the output from multiplier 714) obtained by multiplying a wobble signal and carrier is input to address detector 730. This address detector 730 can have an arrangement, as shown in FIG. 18. More specifically, the phase-detected signal (the output from multiplier 714) is integrated by integrator 7300 on the basis of a timing signal (clocks) received from clock generator 720. The integrated signal is input to slicer 7310 for binary decoding, and also to sync signal detector 7320. Address data controller 7330 receives the sync signal detection result from sync signal detector 7320 and the signal binarized by slicer 7310, and sends its output to, e.g., controller 100 in FIG. 1 so as to control address information. More specifically, address data controller 7330 passes control signals required for write, RF signal read, servo, and the like to controller 100.

Figure 19:
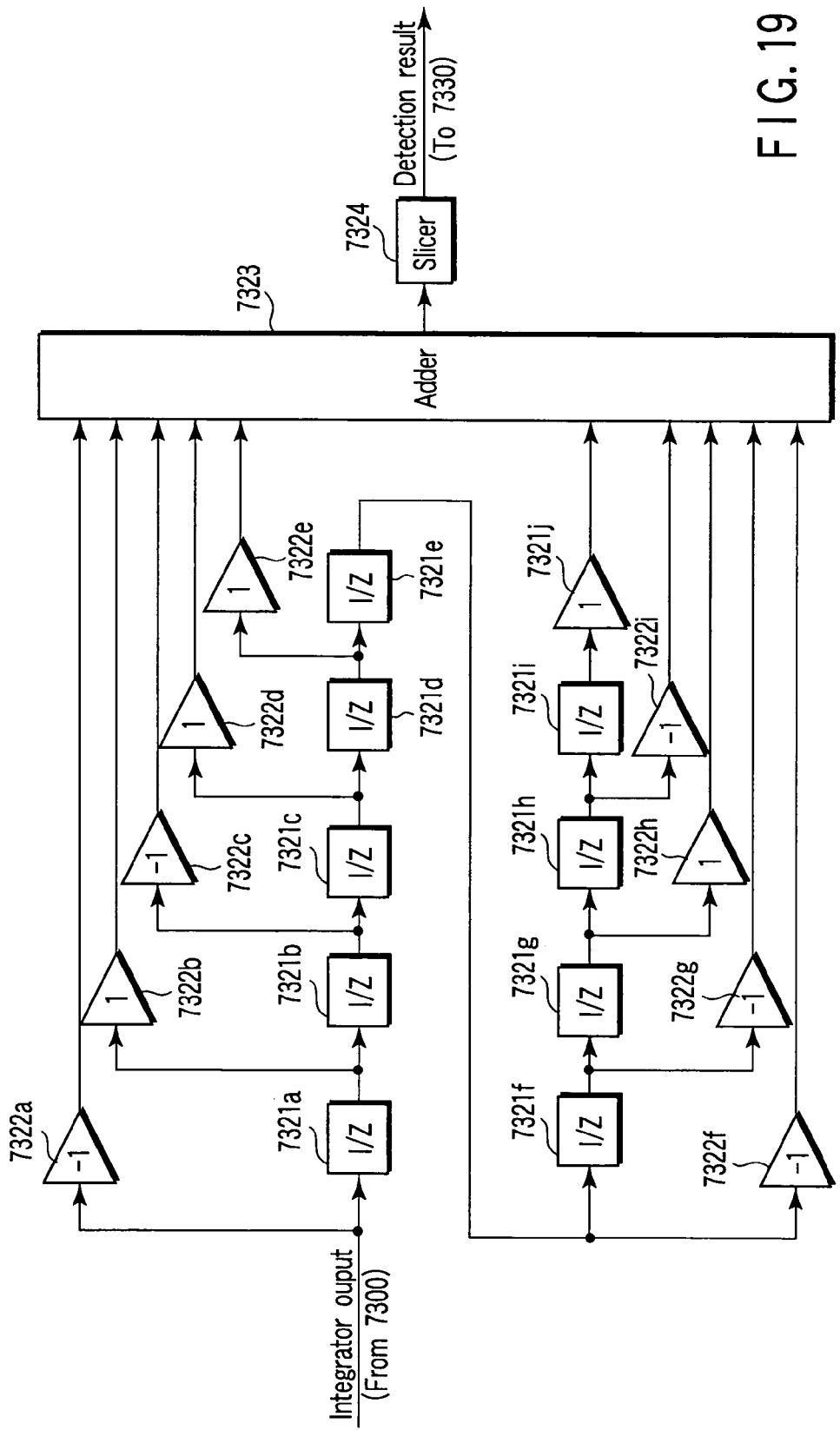
FIG. 19 is a block diagram for explaining a practical example (matched filter) of sync signal detector 7320 in FIG. 18.

FIG. 19 is a block diagram for explaining a practical example (matched filter) of sync signal detector 7320 in FIG. 18. As a detection method of a sync signal, a method that compares a result obtained by binarizing the output from the integrator (by, e.g., the slicer) with a prepared pattern is known. In addition to this method, a method using a matched filter shown in FIG. 19 is available. That is, a method of detecting a sync signal by binarizing the integration result (the output from integrator 7300) via a matched filter or the like shown in FIG. 19 may be used. When this method is used, more accurate detection is assured compared to simple binarization of the integration output.

In the arrangement in FIG. 19, delay devices (1/Z) 7321a to 7321j delay the input signal for one clock synchronized with a bit pattern of the sync signal to be detected. Bits obtained by inverting the bits, which have been delayed one clock each by the delay devices, by inverters 7322a, 7322c, 7322f, 7322g, and 7322i are added to bits which pass through non-inverters 7322b, 7322d, 7322e, 7322h, and 7322j by adder 7323. As a result, an output which changes to "1" only when the integration output from integrator 7300 has a sync signal pattern "0101100101" is output from adder 7323 to slicer 7324. Then, the detection result (of the sync signal) having a fine binary signal waveform is supplied to address data controller 7330 in FIG. 18.

[Description of Wobble Phase Modulator for Recording Sync Signal and Address Information]

Figure 20A:
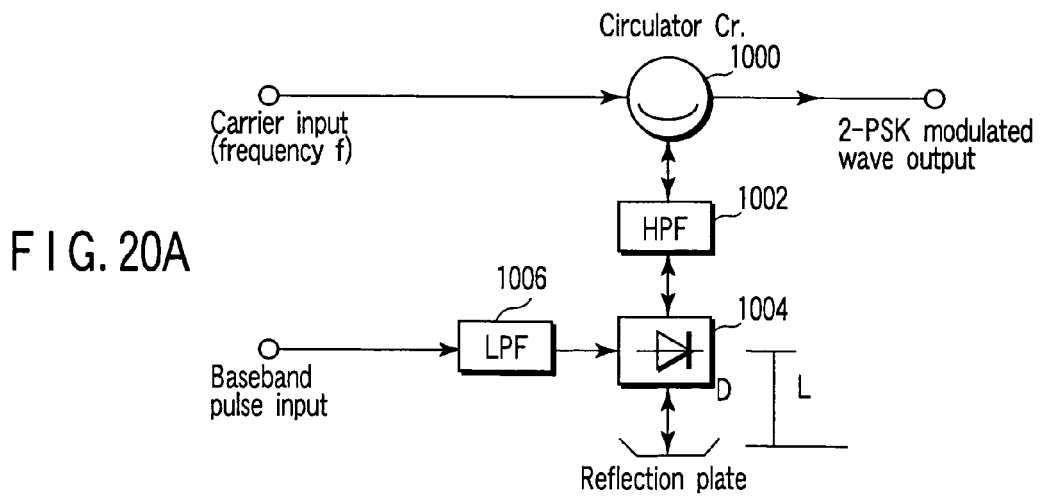
FIGS. 20A and 20B are views for explaining an example of a wobble phase modulator (principal part of a mastering apparatus used to manufacture an optical disc of FIG. 3 or 9) used upon recording the sync signal and address information in FIG. 10.
Figure 20B:

FIGS. 20A and 20B are views for explaining an example of a wobble phase modulator (principal part of a mastering apparatus used to manufacture an optical disc of FIG. 3 or 9) used upon recording the sync signal and address information in FIG. 10. Referring to FIG. 20A, "carrier input" means a Sin wave which is input in accordance with the wobble frequency (f) to be recorded. Also, "baseband pulse input" means a voltage value which is input according to the sync signal and address information to be recorded (FIG. 20B exemplifies the baseband pulse input waveform upon recording "01101001110").

The carrier input to the phase modulator in FIG. 20A takes one of two states: the carrier is guided by circulator (Cr) 1000 to diode (D) 1004 via high-pass filter (HPF) 1002, is reflected there, and reaches a 2-PSK output terminal by circulator 1000 again, or is reflected by a reflection plate beyond diode 1004 and is guided to the output terminal. Selection of these states depends on a voltage applied to diode 1004 via low-pass filter (LPF) 1006, i.e., the voltage of a baseband pulse (FIG. 20B). If the baseband pulse is a positive voltage, diode 1004 is enabled to reflect the carrier. If the baseband pulse is a negative voltage, diode 1004 is disabled, and the carrier is reflected by the reflection plate via diode 1004. If the reciprocal route (L) between diode 1004 and the reflection plate corresponds to phase $\pi$ of the carrier, a 2-PSK modulated wave is obtained.

Upon forming phase-modulated groove wobbles upon mastering optical disc 10, the modulated wave output in FIG. 20A can be used. For example, when the number of wobble waves per bit in the sync signal field is 6, the baseband pulse is switched in correspondence with the symbol pattern of the sync signal for every six carrier waves. Also, when the number of wobble waves per bit in the address information field is 12, the baseband pulse is switched in correspondence with the symbol pattern of the address information for every 12 carrier waves. In this manner, groove wobbles which have been phase-modulated and have recorded information (FIGS. 16A, 16B, and the like) can be formed on optical disc 10.

[Description of Generation of Sync Signal Using Hamming Distance and Number of Phase Changes]

Figure 21:
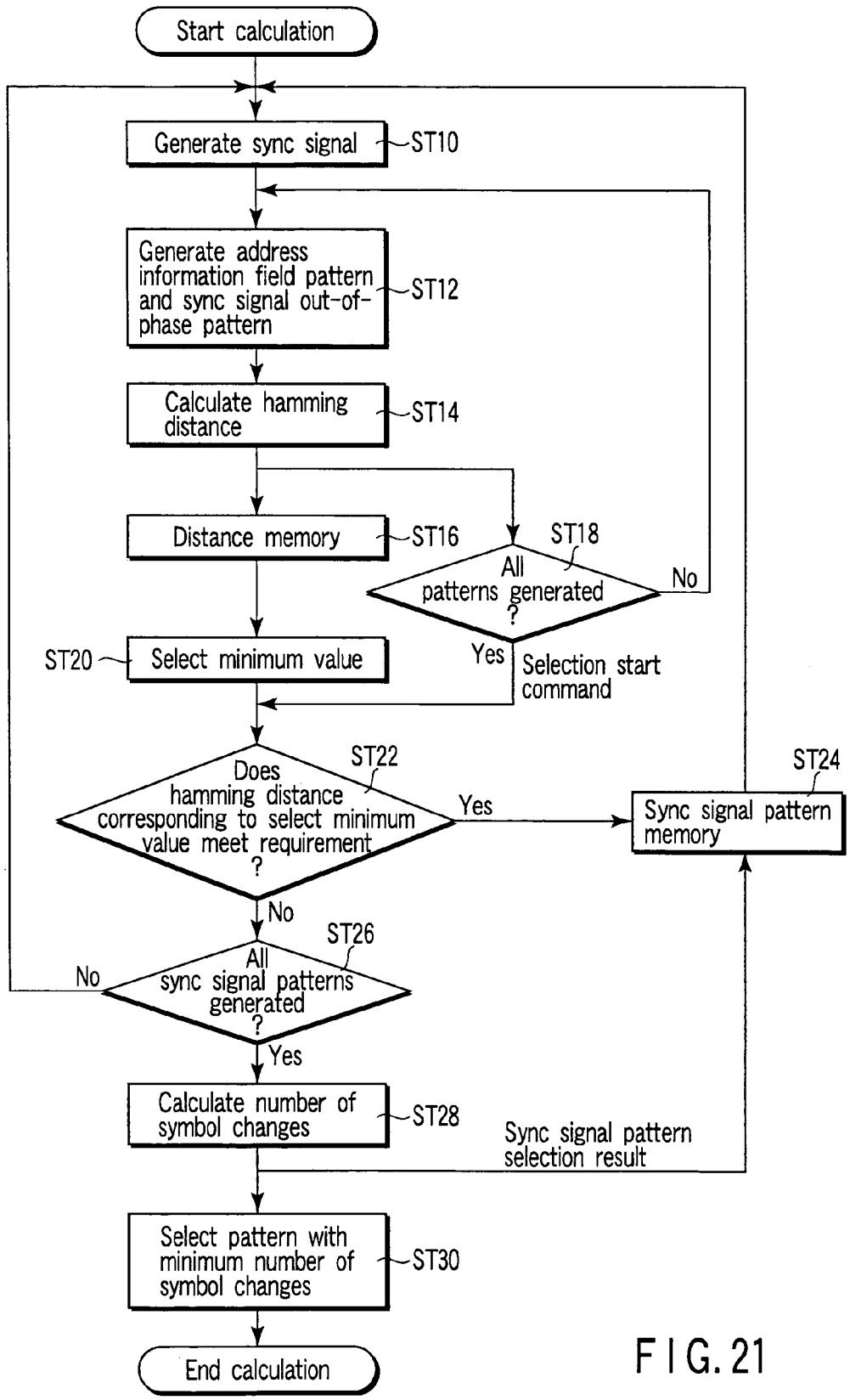
FIG. 21 is a flow chart for explaining an example of a sync signal pattern selection method in accordance with the Hamming distance and the number of phase changes.

The sync signal generation method using the Hamming distance and the number of phase changes will be explained below. FIG. 21 is a flow chart for explaining an example of a sync signal pattern selection method in accordance with the Hamming distance and the number of phase changes. The aforementioned sync signal can be generated according to the flow chart shown in FIG. 21 after the number of digits of the sync signal is determined.

If the number of digits of the sync signal is, e.g., 10 bits, $2^{10}$ sync signal patterns are available. In the sync signal generation process, all these patterns are generated (step ST10). All patterns which may appear in the address information field and all patterns which may appear as a sync signal out-of-phase pattern are generated in accordance with the number of digits of the sync signal (step ST12). As the former patterns, there are $2^9$ patterns since address information includes 11 or 00 as a basic unit. The latter patterns may be generated when all patterns in the address information field neighbor the sync signal patterns.

Hamming distances between the generated sync signal patterns and the address information field patterns or outof-phase patterns are calculated (step ST14). The calculated Hamming distances are stored in a distance memory (step ST16).

It is then checked if all address information field patterns and out-of-phase patterns are generated (step ST18). If patterns to be generated still remain (NO in step ST18), the next pattern is generated (step ST12); otherwise (YES in step ST18), the minimum Hamming distance is selected (step ST20) with reference to the distance memory (step ST16). Since this minimum Hamming distance is a distance to most error-prone patterns in the sync signal patterns of the current candidates, it is desirable to select a sync signal with the largest possible distance.

Note that the following description will continue while abbreviating the sync signal generation method in [Sync Signal Example with Maximum Hamming Distance and Minimum Number of Phase Changes] as <method 3>, and that in [Sync Signal Example with Maximum or Second Maximum Hamming Distance and Minimum Number of Phase Changes] as <method 4>.

For example, if the sync signal is to be generated by <method 3>(YES in step ST22), a sync signal pattern with the largest minimum Hamming distance at the current bit digit position is stored in a sync signal pattern memory (step ST24).

On the other hand, if the sync signal is to be generated by <method 4> (YES in step ST22), a sync signal pattern with the largest minimum Hamming distance and a sync signal pattern with the second largest minimum Hamming distance at the current bit digit position are stored in the sync signal pattern memory (step ST24).

After that, it is checked if all sync pattern candidates at the current bit digit position are generated (NO in step ST22, step ST26). If all patterns are generated (YES-in step ST26), the flow advances to the next step (step ST28); otherwise (NO in step ST26), the next sync pattern is generated (step ST10), thus repeating the same process.

In the "next step", the number of symbol changes in the sync pattern is calculated (step ST28) with reference to the sync signal pattern memory (step ST24). Then, a sync signal pattern with the smallest value is selected with reference to the calculated numbers of symbol changes (step ST30). The sync signal pattern selected in this way is a pattern corresponding to <method 3>or <method 4>.

Effects According to Embodiment (1) An optical disc on which wobbled grooves are concentrically or spirally formed and physical address information is recorded by phase-modulating groove wobbles, is configured to form address information by M wobbles (integer M is the number of wobble waves) per bit as a basic unit, and is configured to NRZ-record the address information. In this way, since 1 bit in the address information field is formed by a plurality of wobbles and information is NRZ-recorded, the number of phase change points in the address information field can be reduced. As a result, the demodulation error rate can be improved.

(2) A sync signal used in sync detection of the address information is formed by N wobbles per bit as a basic unit (integer N is the number of wobble waves and M=2N), and the sync signal with such configuration is recorded on the head side of the address information. Since the number of wobbles per bit of the sync signal is half that of the address information field, the sync signal can be formed and detected without runlength-limiting symbols in the address information field.

(3) The sync signal is configured to contain a symbol sequence 010 or 101 which is not present in the address information, and a symbol sequence with a runlength of 1 or more. In this manner, since the sync signal contains the symbol sequence 010 or 101 which is not present in the address information field, any detection error of the sync signal in the address information field can be prevented. Also, since the sync signal contains a symbol sequence with a runlength of 1 or more, the polarity of demodulated binary data can be detected from the sync signal.

(4) The sync signal is configured to always contain a symbol sequence 10001 or 01110. In this way, since the sync signal contains a symbol sequence 10001 or 01110 which is not present in the address information field, any detection error of the sync signal in the address information field can be prevented. Since 10001 or 01110 has a smaller number of phase changes than 010 or 101 in terms of an identical symbol length, the detection rate of the sync signal can be improved, and the polarity can be detected.

(5) The sync signal is formed using a pattern, which is selected from signal patterns limited by the configuration of (2), and has a largest minimum Hamming distance to all address information symbols and an out-of-phase sync signal among the limited signal patterns and has a smallest number of phase changes in the sync signal. By selecting the pattern in this way, any detection error in the address information field and out-of-phase detection of the sync signal can be prevented. Since the number of phase changes in the sync signal is minimized, the detection rate of the sync signal can be improved.

About out-of-phase detection of sync signal

For example, when a sync signal is 0101, and neighboring symbols are 11 and 00 and their polarities are unknown, the demodulation result is successive symbols 11010100 or 00101011. At this time, whether or not the detected signal is a sync signal is determined by examining if 0101 (or 1010 obtained by bit-inverting 0101) is contained in the demodulated bit sequence. In the former demodulation result (11010100), the sync signal can be normally detected. However, in the latter demodulation result (00101011), the sync signal is detected one bit before the former demodulation result. This is called out-of-phase detection.

(6) The sync signal is formed using a pattern, which is selected from signal patterns limited by the configuration of (2), and has a largest or second minimum Hamming distance to all address information symbols and an out-of-phase sync signal among the limited signal patterns and has a smallest number of phase changes in the sync signal. By selecting the pattern in this way, any detection error in the address information field and out-of-phase detection of the sync signal can be prevented. Since the number of phase changes in the sync signal is minimized, the detection rate of the sync signal can be improved.

(7) The sync signal is formed by suppressing the number of phase changes in this sync signal to BD/3 or less (BD is the number of bit digits of the sync signal). In this way, since the maximum number of phase changes in the sync signal is limited to, e.g., about ⅓, the detection rate of the sync signal can be improved.

(8) The sync signal is configured to contain a symbol sequence as a run of odd-numbered "0"s or "1" as a symbol sequence which are not present in the address information. In this manner, since the symbols which are not present in the address information field and are expressed by a run of odd-numbered "0"s or "1"s are used in the sync signal, any detection error of the sync signal in the address information field can be prevented.

(9) A recording/reproduction apparatus using an optical disc of (1) to (8) is configured to comprise a dedicated detection circuit for detecting the sync signal. In this way, since the detection circuit (e.g., a matched filter) for detecting the sync signal is configured in advance, the sync signal can be detected more accurately than matching determination of the sync signal from the binary decoded result.

As described in detail above, according to the present invention, even when external noise is large, the phase-modulated wobble signal can be demodulated more accurately (than in a case without using the present invention).

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiment is therefore to be considered in all respects as illustrative and not restrictive, the scope of the invention being indicated by the appended claims, rather than the foregoing description, and all changes that come within the meaning and range of equivalency of the claims are therefore intended to be embraced therein.

For example, the present invention can be practiced as a hardware readable recording medium in which information for allowing the hardware to function as predetermined means, allowing the hardware to realize a predetermined function, or allowing the hardware to conduct predetermined means.

What is claimed is:

1. An optical disc on which wobbled grooves are concentrically or spirally formed, and physical address information is recorded by modulating groove wobbles,
    wherein address information is formed by M wobbles per bit as a basic unit, and the address information is NRZ-recorded, where integer M is the number of wobble waves,
    wherein a sync signal used in sync detection of the address information is formed by N wobbles per bit as a basic unit, and the sync signal with that configuration is recorded on the head side of the address information, where integer N is the number of wobble waves and M=2N.

2. An optical disc according to claim 1, wherein the sync signal is configured to contain a symbol sequence 010 or 101 which is not present in the address information, and a symbol sequence with a runlength of not less than 1.

3. An optical disc according to claim 1, wherein the sync signal has a largest minimum Hamming distance to all address information symbols.

4. A reproduction apparatus using an optical disc on which wobbled grooves are concentrically or spirally formed, and physical address information is recorded by modulating groove wobbles,
    wherein address information is formed by M wobbles per bit as a basic unit, and the address information is NRZ-recorded, where integer M is the number of wobble waves,
    wherein a sync signal used in sync detection of the address information is formed by N wobbles per bit as a basic unit, and the sync signal with that configuration is recorded on the head side of the address information, where integer N is the number of wobble waves and M=2N, said apparatus comprising:
    a detector circuit configured to detect the groove wobbles to provide a wobble signal;
    a generator circuit configured to generate a waveform signal from the wobble signal; and
    a dedicated detection circuit configured to detect the sync signal from the waveform signal.

5. A method for reproducing information from an optical disc on which wobbled grooves are concentrically or spirally formed, and physical address information is recorded by modulating groove wobbles,
    wherein address information is formed by M wobbles per bit as a basic unit, and the address information is NRZ-recorded, where integer M is the number of wobble waves,
    wherein a sync signal used in sync detection of the address information is formed by N wobbles per bit as a basic unit, and the sync signal with that configuration is recorded on the head side of the address information, where integer N is the number of wobble waves and M=2N, said method comprising:
    reading the groove wobbles to provide a wobble signal;
    generating a waveform signal from the wobble signal; and
    detecting the sync signal from the waveform signal.

* * * * *